United States Patent
Gudmundsson et al.

(10) Patent No.: US 9,576,412 B2
(45) Date of Patent: Feb. 21, 2017

(54) NETWORK-ASSISTED REMOTE ACCESS PORTAL

(71) Applicant: Verizon Patent and Licensing Inc., Arlington, VA (US)

(72) Inventors: Agust Kr. Gudmundsson, Hackettstown, NJ (US); Rose A. Zoda Goldberg, Marlboro, NJ (US); Maria Cel Halili Zaballero, Ramsey, NJ (US); Kalyani Devu, Belle Mead, NJ (US); Mathivanan S. Munikrishnan, Somerset, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 63 days.

(21) Appl. No.: 14/464,228

(22) Filed: Aug. 20, 2014

(65) Prior Publication Data
US 2016/0055698 A1    Feb. 25, 2016

(51) Int. Cl.
*G07C 9/00* (2006.01)
*H04L 29/06* (2006.01)

(52) U.S. Cl.
CPC ....... *G07C 9/00142* (2013.01); *G07C 9/00134* (2013.01); *G07C 9/00158* (2013.01); *G07C 9/00571* (2013.01); *H04L 63/0861* (2013.01); *H04L 63/107* (2013.01); *H04L 63/108* (2013.01)

(58) Field of Classification Search
None
See application file for complete search history.

(56) References Cited

U.S. PATENT DOCUMENTS

| | | | |
|---|---|---|---|
| 2011/0130134 A1* | 6/2011 | Van Rysselberghe | A47G 29/141 455/422.1 |
| 2012/0234058 A1* | 9/2012 | Neil | G07C 9/00571 70/91 |
| 2012/0280783 A1* | 11/2012 | Gerhardt | G07C 9/00309 340/5.6 |

OTHER PUBLICATIONS

"www.august.com", www.august.com, accessed and downloaded on Nov. 6, 2014.

* cited by examiner

*Primary Examiner* — Daniell L Negron

(57) ABSTRACT

A computing system contains a processor that is configured to receive, with the user interface, a registered access code and access permissions from a remote user of a property having a property location. The registered access code may be configured to provide access to the property. The access permissions may include a predefined access period that the access code is valid to provide access to the property. The processor may further be configured to receive a provided access code of a local user of the property in response to a user location of the local user being near the property location, match the provided access code with the registered access code, and grant or deny access to the property based in part on the provided access code matching the registered access code and being received within the predefined access period.

20 Claims, 4 Drawing Sheets

On-demand Access Process 300

NETWORK-ASSISTED REMOTE ACCESS PORTAL

BACKGROUND

Keyless entry systems typically provide access to an area without requiring a physical key. However, traditional keyless entry systems require a user to carry a keyless remote control dedicated to providing access to that area. With increased use of mobile devices such as smart phones and tablets, there is a need for programs such as web-based portals and mobile device applications to facilitate home and office security, for example, without requiring an additional keyless remote control. In particular, these devices may utilize a subscriber network to provide remote entry and locking to a subscriber with respect to a property. It may be desirable to provide a system allowing a subscriber to register, authenticate, and provide scheduled or on-demand access to an area, for example, personal or business property.

DETAILED DESCRIPTION

A system may be configured to utilize a computing system configured to use a subscriber network to provide a portal for providing scheduled or on-demand access with respect to an entry point of a property. The system may further be configured to allow access to a local user (e.g., with a computing device) in accordance with access permissions including a user list of local users that are authorized to access the property, which may be set by a remote user (e.g., with a computing device) such as an owner or a tenant of the property. The system may utilize an access code that may be managed by remote and administrator users. The system may define an access period (e.g., date, time, length of time, and number of uses) for which the access code is valid to access the property, after which the access code is invalidated by the system and denied access to the property. The system may automatically authenticate the access code, without the additional keyless remote control, in response to location information, for example, of the computing device of the local user arriving at the property. In addition, the system may be used in conjunction with a third-party security monitoring service, for example, by providing a notification to the monitoring service in response to unauthorized access to the property or denying access to the property if the monitoring service detects unauthorized access.

Figure 1:
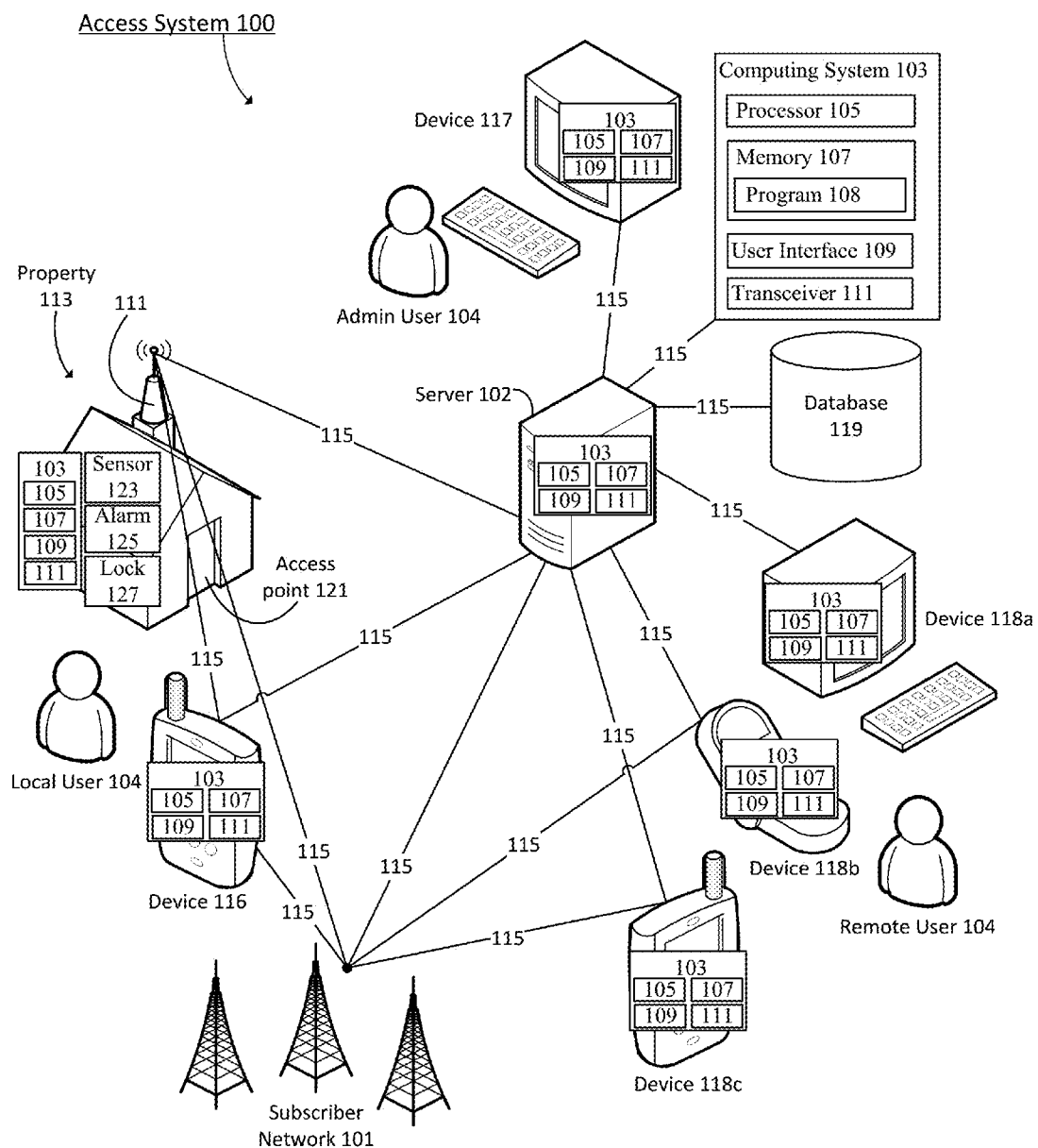
FIG. 1 illustrates an exemplary access system of the present disclosure.

FIG. 1 illustrates an exemplary system 100, for example, to control access to one or more secure areas. System 100 may take many different forms and include multiple and/or alternate components and facilities. While an exemplary system 100 is shown in FIG. 1, the exemplary components illustrated in FIG. 1 are not intended to be limiting. Indeed, additional or alternative components and/or implementations may be used.

As illustrated in FIG. 1, system 100 may include a subscriber network 101, a server 102, a property 113, connections 115, a device 116, a device 117, a device 118 (e.g., devices 118a-c), and a database 119. The system 100 (e.g., devices 116-118) may be configured to be utilized by one or more users 104, for example, a local user 104, an admin user 104, and a remote user 104. The server 102, property 113, and devices 116-118 may include a computing system 103. The computing system 103 may include a processor 105, a memory 107, a user interface 109, and a transceiver 111. Memory 107 may include a program 108 configured to selectively provide access to the property 113. The property 113 may include an access point 121, a sensor 123, an alarm 125, and a lock 127. The database 119 may include a local, remote, or cloud database. The memory 107 and database 119 may be configured to store and transfer (e.g., using processor 105) access information with respect to users 104, property 113, and devices 116-118a-c.

The system 100 may have any number of users 104 with respect to a property 113. The property 113 may include any personal or real estate property (e.g., a home or office building). The users 104 may include a local user 104 (e.g., using device 116), a remote user 104 (e.g., using devices 118a-c), and an admin user 104 (e.g., using device 117). The local user 104 may include any party that is near or intends on accessing the property 113. The local user 104 may have scheduled (and thus limited) access that may be setup remotely (e.g., by the device 118 or remote user 104) or unscheduled access that may be provided on-demand at the property 113. Exemplary local users 104 may include a repair service (e.g., a repair person such as a plumber or an electrician), a housekeeping service, a pet sitter or walker, an exterminator, or any other party that may desire or require access to the property 113.

The remote user 104 may include any party that owns, rents, or has authority to control access of other users 104 (e.g., with devices 118a-c) to the property 113. Exemplary remote users 104 may include an owner, a renter, or a security officer. The remote user 104 may interface with the server 102, admin user 104, and local user 104 using a remote portal (e.g., webpage, smart phone application, or application programming interface (API)), short message service (SMS), e-mail, or voice or video call. In addition, the remote user 104 may communicate in-person with the admin or local user 104.

The admin user 104 may include any party that maintains the access information and access permissions of the users 104 (e.g., with device 117), as described in more detail below. The admin user 104 may also include any party authorized to act as a proxy for the remote user 104, for example, by authorizing access to the property 113 in the event that the remote user 104 is unavailable. Exemplary admin users 104 may include a network administrator, customer care personnel, or a security company.

The system 100 may include a network that provides the infrastructure through which the server 102, property 113, devices 116-118, and database 119 may communicate, for example, to distribute and authenticate access information (e.g., including an access code) to control access to property 113, e.g., using access point 121. For instance, the network may be an infrastructure that generally includes edge, distribution, and core devices (e.g., server 102) and enables a path (e.g., connection 115) for the exchange of access information between different devices and systems (e.g., between server 102, property 113, devices 116-118, and database 119). In general, a network (e.g., system 100 or subscriber network 101) may be a collection of computers and other hardware to provide infrastructure to establish connections and carry communications.

Further, the system 100 may utilize a network with any networking technology. System 100 may utilize any wired or wireless network. The network may include a packet network or any other network having an infrastructure to carry communications. Exemplary networks may include one or more of a cellular network, telephone network, global area network, wide area networks (WAN), a VoIP network, an LTE network, a VoLTE (Voice over LTE) network, fiber optic network, cable network, television network, local area networks (e.g., Ethernet), wireless local area networks (e.g., radio-frequency (RF) or Wi-Fi), power-line networks, private networks (e.g., configured to provide network access limited to devices having network-specific software), or combinations thereof. The network may further include a direct connection such as a wired connection (e.g., a data cable such as a universal serial bus (USB)) or an independent secure connection (e.g., using a private network with network-specific access software) connecting two or more devices. The system 100 is provided as an example, and thus while a single server 102 is illustrated, this illustration may represent a single network, a combination of different networks components and technologies, and/or a plurality of networks, as described herein.

Subscriber network 101 may be configured to provide communications services to and between a plurality of devices (e.g., any or all of the server 102, property 113, and devices 116-118). Subscriber network 101 may also be configured to generate subscriber information including location information, for example a current geographic position of any of property 113 (e.g., providing a property location) and devices 116-118 (e.g., providing a user location). For example, in response to the property location being near the user location, the system 100 may distribute the access code, as described in further detail below. The subscriber network 101 may provide communications services, such as packet-switched network services (e.g., Internet access, VoIP (Voice over Internet Protocol) communication services) and location services (e.g., device positioning), to devices connected to the subscriber network 101. Exemplary subscriber network 101 may include any network discussed above, for example a VoIP network, an LTE network, a VoLTE (Voice over LTE) network, a cellular network, a telephone network, a fiber optic network, a cable network, and a television network, as some non-limiting examples. The devices on the subscriber network 101 may be associated with subscriber information including subscriber identifiers used to uniquely identify the corresponding devices, such as mobile device numbers (MDNs) such as an number used or dialed to communicatively connect with a particular device (e.g., devices 116-118), mobile identification numbers (MINs) such as a mobile equipment identifier (MEID) for identification and tracking of particular devices and stored as part of the memory 107 of each device (e.g., devices 116-118), mobile telephone numbers (MTN), common language location identifier (CLLI) codes, Internet protocol (IP) addresses, and universal resource identifiers (URIs), as some non-limiting examples. The subscriber information may be received by server 102 or the property 113 (e.g., from device 116) to verify an identity of a device 116 or a local user 104, for example, in response to the local user 104 being near the property.

The server 102 may include any computing system configured to communicatively connect the property 113, devices 116-118, and database 119. The server 102 may be connected, via connection 115, to the property 113, devices 116-118, and database 119. Server 102 may be in continuous or periodic communication with property 113 and devices 116-118. Server 102 may include a local, remote, or cloud-based server or a combination thereof and may be in communication with and provide access information (e.g., as part of memory 107 or database 119) to any of property 113 and devices 116-118. The server 102 may further provide a web-based user interface (e.g., an internet portal) to be displayed by any of the user interface 109 of property 113 and devices 116-118. The server 102 may communicate the access information with property 113 and devices 116-118 using an notification, for example automated phone call, short message service (SMS) or text message, e-mail, http link, web-based portal, or any other type of electronic communication. In addition, the server 102 may be configured to store access information as part of memory 107 or database 119. The server 102 may include a single or a plurality of centrally or geographically distributed servers 102.

The server 102 may be configured to selectively provide access (e.g., using a web-based portal) to the access point 121 (e.g., one or more openings or equipment of property 113 such as a door, a mailbox, a lock box, etc.) of the property 113. This access may be provided without an additional keyless remote control, because the system 100 may provide controlled access to the property 113 using the server 102 and devices 116-118 thereby optionally replacing the traditional keyless remote control. The server 102 may be configured to allow the device 118 or remote user 104 to configure the access permissions for the local users 104 having devices 116. For example, the access preferences may be configured by the device 118 or remote user 104 to allow the device 117 or admin user 104 to provide access during predefined hours, for example a security company may be allowed to provide access to the property 113 anytime or only during specified hours such as 9 am-5 pm, AM or PM only, or during daytime or nighttime. The server 102 may be remote from or local to the property 113. The server 102 may manage and control a single property 113 or a plurality of properties 113.

Server 102 may be configured to store and coordinate access information with property 113, devices 116-118, and database 119. The access information may include subscriber information, location information (e.g., property and user locations), an access code, access preferences, a component listing, and an access log. The subscriber information may be used to provide an identity or location of a particular device 116 or local user 104, which may be provided from the device 116 to the server 102 in response to the location information of the device 116 being near the location information of the property 113. For example, the device 116 may compare the location information of the device 116 (e.g., using a GPS) and the location information of the property 113 (e.g., provided to the device 116 by the device 118) and, in response to the device 116 and the property 113 being within a predefined distance defined as part of the access preferences, send the location information of the device 116 (e.g., using transceiver 111) to the server 102 (e.g., using the subscriber network 101). The access code may be configured to provide access to property 113 using program 108, as described in further detail below. The component listing may include model information and specifications regarding computing system 103, sensor 123, alarm 125, and lock 127. The access log may include a listing of each instance in which access was provided or attempted with respect to property 113 and, in response to a predefined number of instances defined as part of the access preferences, the server 102 or property 113 may be configured to disable access to the property 113 and send a notification to the devices 116-118.

The access preferences may include a user list of users 104 associated with devices 116 and, for each device 116 or user 104, a phone number, a password, a username, a security level, a class of service, a user proximity, and an access confirmation (e.g., audio, picture, or video) associated with each device 116 or user 104. The user list may include one or more individual users 104, groups (e.g., companies or organizations) of one or more users 104, or categories (e.g., personal or business) of one or more users 104. The user list may specify individual names of individual users or group names of groups associated with a plurality of individual users, as described in further detail below. The phone number, password, and username for each user 104 may be defined by each user 104, e.g., using a web-based portal. The security level defines the types of access the user 104 has to the property 113, which may be defined by the remote user 104 using the web-based portal. For example, an owner or parent may have a security level allowing registration of new access codes, but a guest or child may have a security level allowing access but not registration of access codes. As a further example, the security level may specify that on-demand access to the property 113 is allowed, but not scheduling of access for other users 104. The class of service may include how many users 104 or access codes may be stored or used. The user proximity may include a predefined distance (e.g., specified by a user 104) between the user location (e.g., of device 116) and the property location (e.g., of property 113) for which the access code may be transmitted from the server 102 to the device 116 or local user 104 (e.g., automatically in response to a device 116 or user 104 being at or within the user proximity) or for which the alarm 125 disarms and the lock 127 unlocks (e.g., automatically in response to a device 116 or user 104 being at or within the user proximity) and the alarm 125 arms and the lock 127 locks (e.g., automatically in response to a device 116 or user 104 being at or outside the user proximity), as described in further detail below. The access confirmation may specify if audio, image (e.g., facial, QR code), video, or barcode confirmation of the device 116 or local user is to be confirmed by the device 118 or remote user 104 before the device 116 or local user 104 may access the property 113. The confirmation may be captured real-time by a microphone, camera, or optical scanner as part of device 116 or property 113 and sent (e.g., automatically) to server 102 and devices 117-118. For example, the device 118 may receive and display the confirmation along with a prompt to grant or deny access as part of the user interface 109 and, after receiving an indication in response to the prompt, send the indication to the server 102 and property 113.

The system 100 (e.g., server 102 or property 113) may include access preferences configured to control access with respect to a group including a plurality of members (e.g., having devices 116). The system 100 (e.g., server 102 or property 113) may be configured to send a notification (e.g., requesting service) to a group from which a member of the group may be sent or dispatched to the property 113 (e.g., using device 116) without specifying which member (e.g., an individual name or subscriber identifier). Particular members of the group may have access conditions defined as part of the access preferences, which may define different conditions for which particular members may be granted access to the property 113. For example, particular members may have predefined access times (e.g., a first member may enter between 7 pm and 8 pm, a second member may enter between 7 pm and 9 pm, and a third member may enter between 7 pm and 10 pm). Further, the access may be granted by the property 113 in response to receiving a password from the device 116 of the member and when the location information of the device 116 is in the predefined distance of the property 113, as described above. Additionally, the access preferences may define to which portions or equipment of the property 113 the particular members may access (e.g., all members may have access to the front door, but only a particular member may have access to a lock box or mailbox or an interior door). The access preferences of particular member may overlap or may be in common with other members. Particular access preferences may be applied to an entire group or a plurality of members of the group or the access preferences may be the same for the group. A group or particular members may have a predefined number of accesses to the property 113, after which access may be denied and a notification may be sent to the server 102 and devices 116-118.

To promote data security, the access information may be encrypted and unencrypted using secure key classes. For example, a key may be included in a text field in a file record as part of the access information data or as part of memory 107 or database 119. Using an encryption-decryption algorithm, the key may be encrypted (e.g., by processor 105 of server 102) for transmission of the access information and decrypted (e.g., by processor 105 of property 113 or device 116) for the receipt of access information. Upon decryption of the access information, the access code may be utilized to access to property 113. As the access information passes through system 100, the access information may be decrypted and unencrypted with an algorithm using the secure key classes. An exemplary encryption-decryption algorithm may include an RSA algorithm that may use a product of prime numbers along with an auxiliary value as a public RSA key to encrypt the access information (e.g. at subscriber network 101 or server 102) and knowledge of the prime numbers as a private RSA key (e.g., as part of database 119 or memory 107 of computing system 103 of property 113 or device 116) to decrypt the access information. Upon decryption of the access information (e.g., at property 113 or device 116), the received access code may be authenticated by comparing an access code of device 116 with an access code of property 113, as described in further detail below. In addition, the private RSA keys may be periodically changed to change the working public RSA keys over time or as the access information passes through system 100.

The computing system 103 may be configured to provide scheduled or on-demand access to the property 113. The computing system 103 may include any device (e.g., property 113 and devices 116-118) configured to utilize program 108, display program 108 to a user 104, or transfer access information and the location information of the device 116 (e.g., for enhanced security). Devices 116-118 may also be configured to receive and display access information (e.g., access code), prompt an authorization response from the device 118 or remote user 104, and, if authorized, send the access information (e.g., access code) and the location information of the device 116 to the property 113 (e.g., using connection 115). For example, the server 102 or device 116 may compare the location information of the device 116 (e.g., determined using GPS) with the location information of the property 113 and display the access information in response to the location information of the device 116 and property 113 being in the predefined distance, as described above. Alternatively, the access information (e.g., access code) may be automatically sent from the server 102 or devices 117-118 to the device 116, for example, in response to the device 116 being near the property 113. For example, in response to the location information of the device 116 and property 113 being in the predefined distance, the server 102 may automatically send the access information to the device 116. The computing system 103 of property 113 may further communicate access information (e.g., using connections 115) to server 102, devices 117, and devices 118a-c to register the access as part of the access information as part of memory 107 (e.g., of server 102 or property 113) or database 119.

The computing system 103 may include a user interface 109. The user interface 109 may include a display, support user interfaces, and/or communicate within the system 100. A display is an output device for presentation of information in visual or tactile form, such as a user interface communicatively connected to a web-based portal. Examples of a display may include, without limitation, cathode ray tube display, light-emitting diode display, electroluminescent display, electronic paper, plasma display panel, liquid crystal display, high-performance addressing display, thin-film transistor display, organic light-emitting diode display, surface-conduction electron-emitter display, laser TV, carbon nanotubes, quantum dot display, interferometric modulator display, and the like. Thus, the display may present user interfaces or a remote portal to a user, such that the user may interact with and receive information from other devices of system 100. For example, the user interface 109 of the property 113 may include a touchpad or keyboard configured to manually receive an access code or an optical scanner configured to scan the access code (e.g., a machine readable code) from the device 116.

The computing system 103 (e.g., of property 113 or server 102) may also be configured to provide a notification to the devices 116-118 (e.g., local, admin, or remote user 104). The notification may include an automated phone call, short message service (SMS) message, e-mail, http link, web-based portal, or any other type of electronic communication. The notification may be provided in response to the device 116 or local user 104 providing or entering an access code, in response to unauthorized access to the property 113, or in response to the location information of the device 116 being near the property 113. The notification may include how many access attempts have been made and how many remain before the user interface 109 prohibits additional access attempts. The notification may include the access information of the particular user 104.

The program 108 may be configured to register a user 104 with the server 102. The program 108 may be configured to receive a user address (e.g., owner or guest address), billing information (e.g., billing address of owner), subscriber information (e.g., user and device identification information), and purchase options (e.g., payment frequency and method) for local and remote users 102. The program 108 may also be configured to allow remote users 104 to define passwords (e.g., to access the web-based portal), access codes (e.g., to access property 113), and access permissions (e.g., an access period such as a date, time, and duration and number of uses for which the access code is valid to provide access to property 113). The program 108 may be configured to allow the remote user 104 (e.g., owner) or an admin user 104 to define access preferences for overriding an alarm or forcing access to the property 113 without an access code, e.g., including disarming the alarm 125 and an unlocking the lock 127.

The access information may be authenticated, for example, to selectively provide access to an access point 121 of the property 113. The access code may be generated by processor 105 (e.g., using a random number generator) or may be specified and provided by the device 118 or remote user 104 to server 102. The server 102 may send the access code to device 116 or the device 118 may transmit the access code (e.g., encrypted) to device 116, for example, in response to a notification that the device 116 or local user 104 is near the property 113 or in response to a user input (e.g., a notification requesting the access code) from the device 116. The access code may be provided to a plurality (e.g., group) of devices 116 or a particular device 116 (e.g., a member of the group) and may be provided in advance of or in response to the device 116 being near the property 113. Upon receipt of the access code, the device 116 may be configured to decrypt and display the access code to local user 104 or transmit the access code (e.g., using the transceiver 111 of device 116) to property 113 (e.g., using the transceiver 111 of property 113). Alternatively, the remote user 104 may verbally provide the access code to local user 104, which may be manually entered into a user interface 109 of the computing system 103 of the property 113. In this case, the property 113 may authenticate the manually-entered access code with the server 102. The property 113 may receive an access code (referred to as received access code) in response to the notification or send a request to receive an access code from server 102 (referred to as a registered access code). With the access codes of the server 102 and local user 104 or device 116, the computing system 103 of the server 102 and property 113 may authenticate or compare these access codes. If the access codes match, access may be granted to access point 121, for example, without requiring an additional keyless remote. The access preferences may provide for access to the property 113 with an identical or a partial match. The identical match may provide access in response to all characters of the received access code matching the registered access code. The limited match may provide access in response to a predefined number or percentage of the characters of the received access code matching the registered access code. The identical or limited match may be specified as part of the access preferences and according to the particular user 104 or property 113. With matching access codes, the property 113 may facilitate access to the property 113 via access point 121. The access code may be a temporary access code, for example being valid for a predefined period of time.

The access code may be automatically disabled (e.g., as defined by access permissions as part of server 102) and a notification may be sent (e.g., by property 113 or server 102 to devices 116-118), for example, in response to a power failure, a predefined number of failed access attempts (e.g., by the user 104 or device 116 providing an access code to the user interface 109 of the property 113 and processor 105 of the server 102 or property 113 determining if the received access code matches the registered access code, as described above), or expiration of the predefined period of time. Based on and specified as part of the access permissions, the user interface 109 of the property 113 may be configured to display an error code in response to receiving an access code that is, for example, invalid (e.g., wrong access code), disabled (e.g., access intentionally denied by the remote or admin user 104), or expired (e.g., the predefined period of time has passed). The error code for each condition may be unique. In another embodiment, the user interface of the device 116, rather than the user interface 109 of the property 113, may be configured to display the error code, having been sent the error code by the server 102 or the property 113. Alternatively, the access permissions may be configured not to indicate an error code (e.g., as an additional security feature).

The program 108 may be configured to utilize location information (e.g., a current geographic position) from transceiver 111, for example, to confirm a location of any of property 113 and devices 116-118. For example, in response to the location information of device 116 indicating that device 116 is at or near property 113, program 108 may be configured to send an access code (e.g., from server 102) to device 116 or a notification to any or all of device 117 and 118*a-c*, which may prompt devices 117 or devices 118*a-c* to provide an access code to device 116. Alternatively, in response to the location information of device 116 indicating that device 116 is at or near property 113, the device 116 may send an access code (e.g., as part of the memory 107 of the device 116) from the device 116 (e.g., sent using transceiver 111) to the property 113 (e.g., received using transceiver 111). The location information (e.g., the property location and device location) may be determined by transceiver 111 or may be stored as part of the access information. Thus, based on location information, program 108 may be configured to directly provide an access code to device 116 or a notification to any or all of devices 117 and 118*a-c*.

Transceiver 111 may communicatively connect the devices of system 100, for example, using any type of wired or wireless network connection. The wireless network may utilize a wireless transmitter (e.g., cellular, radiofrequency (RF) or Wi-Fi transmitter) of transceiver 111. Transceiver 111 may be configured to communicatively connect any or all of subscriber network 101, server 102, property 113, and devices 116-118. In addition, the property 113 may include two or more transceivers 111, for example a first transceiver 111 (e.g., near the user interface 109 and configured to communicate with the device 116) in communication with a second transceiver 111 (e.g., mounted remotely from the first transceiver 111 and configured to communicate with the subscriber network 101). Transceiver 111 may be used for digital or analog signal transfers. For instance, transceiver 111 may include any antenna technology including cellular, radiofrequency (RF), near field communication (NFC), Bluetooth®, Wi-Fi, or the like. Transceiver 111 may include any technology that implements a wireless exchange of access information by converting propagating electromagnetic waves to and from conducted electrical signals. Transceiver 111 may include any technology that is used to exchange access information wirelessly using radio waves over a radio range or network that enables communication. The transceiver 111 may also include a location determination technology that enables the determination of location information (e.g., a current geographic position) of any of property 113 and devices 116-118. Examples of location determination technology may include, without limitation, global positioning systems (GPS), indoor positioning system, local positioning system, and mobile phone tracking. The transceiver 111 may be configured to provide a current geographic position of any of property 113 (e.g., providing a property location) and devices 116-118 (e.g., providing a user location).

The connections 115 may be any wired or wireless connections between two or more endpoints (e.g., devices or systems), for example, to facilitate transfer of access information (e.g., including subscriber information and access information). Connection 115 may include a wireless connection, for example, to communicatively connect property 113, device 116, and devices 118*b-c* with server 102. Connection 115 may include a wide area network connection, for example, to communicatively connect subscriber network 101, device 117, and device 118*a* with server 102. Connections 115 may include a cellular connection, for example, to communicatively connect devices 116 and devices 118*b-c* with subscriber network 101. Connection 115 may include a radiofrequency connection, for example, to connect device 116 with transceiver 111 of property 113. Connection 115 may include any combination of connections 115, for example, wide area network connections (e.g., public or cellular network) between devices 116 and 118 and direct connections (e.g., wired or independent secure connections) between server 102, property 113, and device 117, for example, to provide a higher level of access for the admin user 104. In addition, connection 115 may also include a direct connection between any of devices 116-118 and server 102 or property 113.

The sensor 123 may include one or more motion detectors, microphones, cameras, access point sensors, biometric sensors, and machine readable code scanners, which may be configured to output sensor information (e.g., recorded or real-time) to the sever 102. The sensor information may also be cached or stored as part of memory 107 (e.g., in the event of connectivity issues with server 102) and sent to the server 102 at a later time. The motion sensors may include infrared motion sensors configured to detect movement inside or outside the property 113. The microphone may include any device configured to obtain and send recorded or real-time audio of the local user 104 or property 113 to server 102. The camera may include a picture or video camera configured to obtain and send a recorded or real-time image or video of the local user 104 or property 113 to server 102. The sensor 123 may be configured to provide audio, picture, or video monitoring of the property 113, which may be activated in response to an access code being entered by a local user 104 or the location information of the device 116 being near the property 113. The sensors 123 may include magnetic proximity or vibration sensors for access points 121, e.g., windows and doors. The biometric sensors (e.g., scanner or microphone) may be configured to receive (e.g., scan or record) a biometric input (a fingerprint, voiceprint, or facial recognition) of a user 104. The machine readable code scanner (e.g., an optical scanner) may be configured to scan a machine readable code such as a quick response (QR) code or barcode displayed as part of device 116.

The program 108 may be configured to authenticate access with respect to the property 113, for example, using sensor information. The program 108 may utilize real-time sensor information from sensors 123 (e.g., microphones or cameras) at property 113 or an audio, picture, or video input device as part of device 116 to provide recorded or real-time audio, images, or video to server 102. The sensor information may be provided to devices 117 and 118*a-c* to confirm that access may be granted or denied to a local user 104. The program 108 may authorize access to property 113 by receiving sensor information (e.g., a biometric input such as a fingerprint, voiceprint, or facial recognition) of a user 104), which may be received by a scanner or microphone as part of computing system 103 of device 116 or 118*a-c*. In addition, the program 108 may be configured to provide the device 116 or local user 104 with a machine readable code (e.g., a quick response (QR) code or barcode) to be scanned by or a notification (e.g., SMS) containing an access code to be entered into the user interface 109 as part of property 113.

The sensor information from the sensors 123 may be sent to server 102 to be stored as part of the access information of sever 102 (e.g., memory 107) or database 119, which may be sent as a notification to devices 117 or 118a-c. The received sensor information from property 113 may be authenticated or matched against registered sensor information as part of the access information of the server 102. For example, the sensors 123 may receive sensor information and, using computing system 103, compare the received sensor information with registered sensor information (e.g., previously registered as part of the access information of server 102 or database 119). In addition, the server 104 may be configured to obtain a status of the property 113, for example, using sensors 123.

The alarm 125 may include any wireless or wired alarm system. The alarm 125 may be operatively connected to transceiver 111 of the property 113 to communicatively connect with device 116 or with the server 102. The alarm 125 may be armed and disarmed in response to an access code received by user interface 109 or device 116. The alarm 125 may be operatively connected to the sensors 123 and the locks 127. The alarm 125 may be configured to send a notification to authorities (e.g., a police department, fire department or security company) in response to an unauthorized access to the property 113. The alarm 125 may be controlled by a user interface 109 of property 113 or by server 102. For example, the device 116 or local user 104 may disarm and arm the alarm 125 by providing an access code to the user interface 109 of the property 113. As a further example, the device 118 or remote user 104 may disarm and arm the alarm 125 with the access code at the property 113 or remotely using server 102. The alarm 125 may provide a notification to a police department, fire department, or a security company. The notification may be sent using an automated phone call, short message service (SMS) message, e-mail, http link, web-based portal, or any other type of electronic communication. The alarm 125 may be configured to be remotely disarmed and armed, for example, using server 102. The alarm 125 may include an alarm protocol, for example, in response to an indication from sensor 123 an audio alert or siren may inform an unauthorized person to vacate the property 113.

The lock 127 may include any mechanical or electrical device configured to selectively allow access point 121 to open or provide access to the property 113. The lock 127 may be unlocked or locked, for example, in response to an access code, password, key, magnetic keycard, fingerprint, voiceprint, facial recognition, or radiofrequency identification (RFID) card. The lock 127 configured to operate (e.g., lock and unlock) via wireless or wired connections to the computing system 103 of the property 113. One or more locks 127 may be placed at each access point 121. An exemplary lock 127 may include a warded lock, pin tumbler lock, wafer tumbler lock, disc tumbler lock, lever tumbler lock, cam lock, chamber lock, cylinder lock, deadbolt, electric strike, magnetic, or padlock.

The program 108 may be operatively connected to the alarm 125 and the lock 127. The program 108 may display information regarding the alarm 125 and lock 127 as part user interface 109, for example, using a remote portal as described above. The device 118 or remote user 104, using the program 108, may disarm the alarm 125 and unlock the lock 127 (e.g., to provide access to the property 113) and arm the alarm 125 and lock the lock 127 (e.g., after a local user 104 has left the property 113). Further, the alarm 125 may be disarmed and the lock 127 may be unlocked (e.g., automatically) in response to the device 116 or user local 104 being within the user proximity, as described above, and the alarm 125 may be armed and the lock 127 may be lock (e.g., automatically) in response to the device 116 or user 104 being outside the user proximity. The access preferences may define the response of one or more alarms 125 and locks 127. For example, the access preferences may define particular alarms 125 that disarm and locks 127 unlock for particular users 104, e.g., specifying automatic access or manually-entered access codes. The access preferences may also define particular alarms 125 that disarm automatically and locks 127 unlock automatically, for example, in response to the location information of the device 116 being in the predefined distance of the property 113, as described above. The access preferences may additionally define particular users 104 or locks 127 for which a physical key is required or automatic unlocking is provided. The device 117 or admin user 104 (e.g., a service provider of security monitoring service) may enable and disable the alarm 125, for example, in response to a request by the device 118 or remote user 104 to deactivate service or in response to a failure to pay by the remote user 104. In response to unauthorized access to the property 113, the program 108 may be configured to initiate a panic alarm such as an audio alert or siren (e.g., urging the unauthorized party to vacate), send a notification to authorities and users 104, and invalidate access codes to prevent additional parties from entering the property during the alarm.

Any portion of system 100 (e.g., server 102, property 113, and devices 116-118) may include a computing system and/or device that includes a processor 105 and a memory 107. Computing systems and/or devices generally include computer-executable instructions, where the instructions may be executable by one or more devices such as those listed below. Computer-executable instructions may be compiled or interpreted from computer programs created using a variety of programming languages and/or technologies, including, without limitation, and either alone or in combination, Java™, C, C++, Visual Basic, Java Script, Perl, SQL, PL/SQL, Shell Scripts, etc. The system 100 and server 102, property 113, devices 116-118, and database 119 may take many different forms and include multiple and/or alternate components and facilities, as illustrated in the Figures further described below. While exemplary systems, devices, modules, and sub-modules are shown in the Figures, the exemplary components illustrated in the Figures are not intended to be limiting. Indeed, additional or alternative components and/or implementations may be used, and thus the above communication operation examples should not be construed as limiting.

In general, computing systems and/or devices (e.g., server 102, computing system 103, and devices 116-118) may employ any of a number of computer operating systems, including, but by no means limited to, versions and/or varieties of the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OS X and iOS operating systems distributed by Apple Inc. of Cupertino, Calif., the BlackBerry OS distributed by Research In Motion of Waterloo, Canada, and the Android operating system developed by the Open Handset Alliance. Examples of computing systems and/or devices include, without limitation, mobile devices, cellular phones (e.g., device 118b), smart-phones (e.g., devices 116 and 118c), super-phones, tablet computers, next generation portable devices, mobile printers, handheld computers, secure voice communication equipment, networking hardware, or some other computing system and/or device. Alternatively, computing systems and/or devices may also be a computer workstation (e.g., devices 117 and 118a), a server, a desktop, a notebook, a tablet, a phone, desktops, notebooks, laptops, phones, tablets, computer workstations, next generation portable devices, handheld computers, or some other computing system and/or device.

Further, processors such as processor 105 receives instructions from memories such as memory 107 or database 119 and executes the instructions, thereby performing one or more processes, including one or more of the processes described herein. Such instructions and other access information may be stored and transmitted using a variety of computer-readable mediums (e.g., memory 107 or database 119). Processors such as processor 105 may include processes comprised from any hardware, software, or combination of hardware or software that carries out instructions of a computer programs by performing logical and arithmetical calculations, such as adding or subtracting two or more numbers, comparing numbers, or jumping to a different part of the instructions. For example, the processor 105 may be any one of, but not limited to single, dual, triple, or quad core processors (on one single chip), graphics processing units, visual processing units, and virtual processors.

A memories such as memory 107 or database 119 may include, in general, any computer-readable medium (also referred to as a processor-readable medium) that may include any non-transitory (e.g., tangible) medium that participates in providing access information or instructions that may be read by a computer (e.g., by the processors 105 of the server 102, computing system 103, property 113, and devices 116-118). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including radio waves, metal wire, fiber optics, and the like, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

The server 102, property 113, and devices 116-118 may include processor 105 that is configured to perform operations with respect to the access information, for example store access information as part of memory 107 or database 119. The server 102, property 113, and devices 116-118 may further utilize the processor 105 to register, access, receive, display, and authenticate access information, as described herein. Further, databases, data repositories or other access information stores (e.g., memory 107 and database 119) described herein may generally include various kinds of mechanisms for storing, providing, accessing, and retrieving various kinds of access information, including a hierarchical database, a set of files in a file system, an application database in a proprietary format, a relational database management system (RDBMS), etc. Each such access information store may generally be included within (e.g., memory 107 or external (e.g., database 119) to a computing system and/or device (e.g., server 102, property 113, and devices 116-118) employing a computer operating system such as one of those mentioned above, and/or accessed via a network (e.g., system 100 or subscriber network 101) or connection in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

The computing system 103 may include any electronic hardware that includes a processor 105 and a memory 107, that is capable of performing the operations discussed herein including the registration, display, and authentication of the access information (e.g., access code) between any of server 102, devices 116-118, and property 113, and that is configured to utilize communications technologies between any of server 102, devices 116-118, and property 113. Examples of communication technologies may include, without limitation, any wired or wireless communication technology, such as cellular, near field communication (NFC), Bluetooth®, Wi-Fi, and radiofrequency (RF) technologies. Communication technologies may include any technology configured to exchange electronic access information by converting propagating electromagnetic waves to and from conducted electrical signals.

Figure 2:
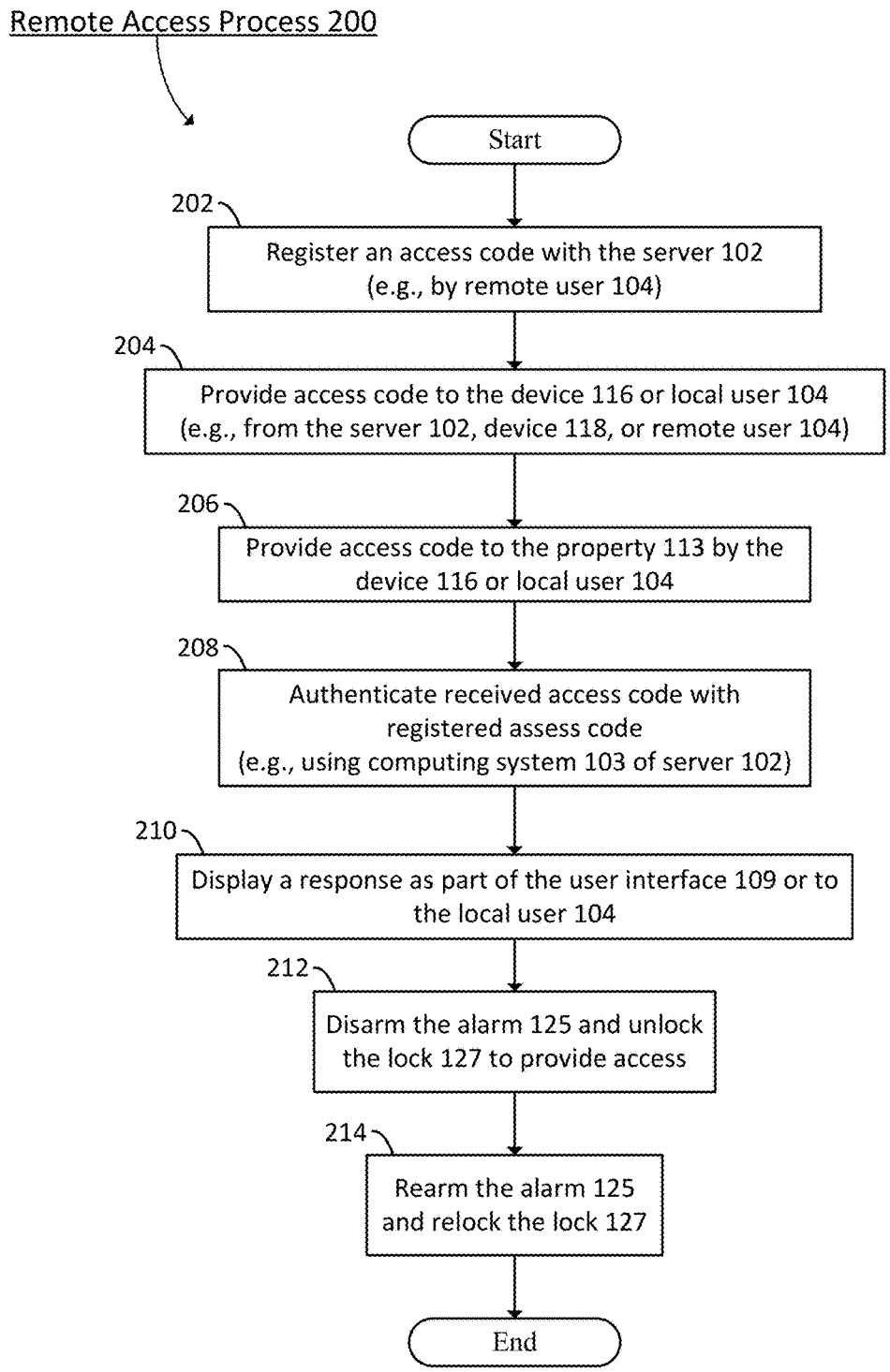
FIG. 2 illustrates an exemplary remote access process.

FIG. 2 illustrates an exemplary on-demand access process 200. Process 200 may take many different forms and include multiple and/or alternate components and facilities. While an exemplary process 200 is shown in FIG. 2, the exemplary components illustrated in FIG. 2 are not intended to be limiting. Indeed, additional or alternative components and/or implementations may be used.

At block 202, the device 118 or remote user 104 may register an access code and associated access preferences with the server 102 for the device 116 or local user 104 to access the property 113. Access to property 113 may be provided to a plurality of devices 116 or users 104 having the same or different access codes and access periods, as described above. For example, different devices 116 or users 104 (e.g., a repair person and a dog walker) may arrive at property 113 during the same access period, but the users 104 may have the same or different access codes. Alternatively, different devices 116 or users 104 may have the same access code, but access may be granted during the same or different access periods.

At block 204, the access code is provided to the device 116 or local user 104. The access code may be transmitted from the server 102 or the device 118 to the device 116 using connection 115. Alternatively, the access code may be verbally provided to the local user 104, for example, in person or via telephone.

At block 206, the access code may be provided to the property 113 by the device 116 or local user 104. The local user 104 may manually type or speak the access code into a user interface 109 of the property 113. Alternatively, the transceiver 111 of the device 116 may transmit the access code to the transceiver 111 of the property 113 using connection 115 (e.g., Bluetooth or Wi-Fi) or user interface 103 of device 116 may display the access code to a scanner of the property 113.

At block 208, the computing system 103 of server 102 or property 113 may authenticate the received access code with the registered access code of the server 102. For example, the server 102 may send the registered access code to the property 113 prior to or in response to the property 113 receiving the access code from the device 116 or local user 104. Alternatively, the received access code may be sent from the property 113 to the server 102 in response to being received from the device 116 or local user 104. If the access codes match, the server 104 may send a request to computing system 103 of the property 113 to disarm the alarm 125 and unlock the lock 127. If the access codes do not match, the server 104 may send a notification to devices 117-118.

At block 210, the user interface 109 of the property 113 may display a response to a local user 104 or a user interface 109 of property 113 indicating a success or access granted (e.g., in response to matching access codes) or failure or access denied (e.g., in response to non-matching, invalid, disabled, or expired access codes) regarding access to the property 113. For example, the response may also indicate a number of access codes that remain to be assigned to users, a time in which the alarm 125 will rearm, or information regarding the property 113 (e.g., the repair service has already been performed or the pets have already been fed or walked).

At block 212, the alarm 125 may be disarmed and lock 127 may be unlocked thereby providing access to the property 113.

At block 214, the alarm 125 may be configured to rearm in response to a sensor 123 (e.g., motion sensor) indicating that the device 116 or local user 104 has left or in response to the device 116 or local user 104 providing or entering the access code to arm the alarm 125. Alternatively, the alarm 125 may be configured to rearm after a predefined access period (e.g., as part of the access permissions) after the device 116 or local user 104 has provided or entered the access code or of inactivity (e.g., lack of movement indicated by sensor 123). After block 214, the process 200 ends.

Figure 3:
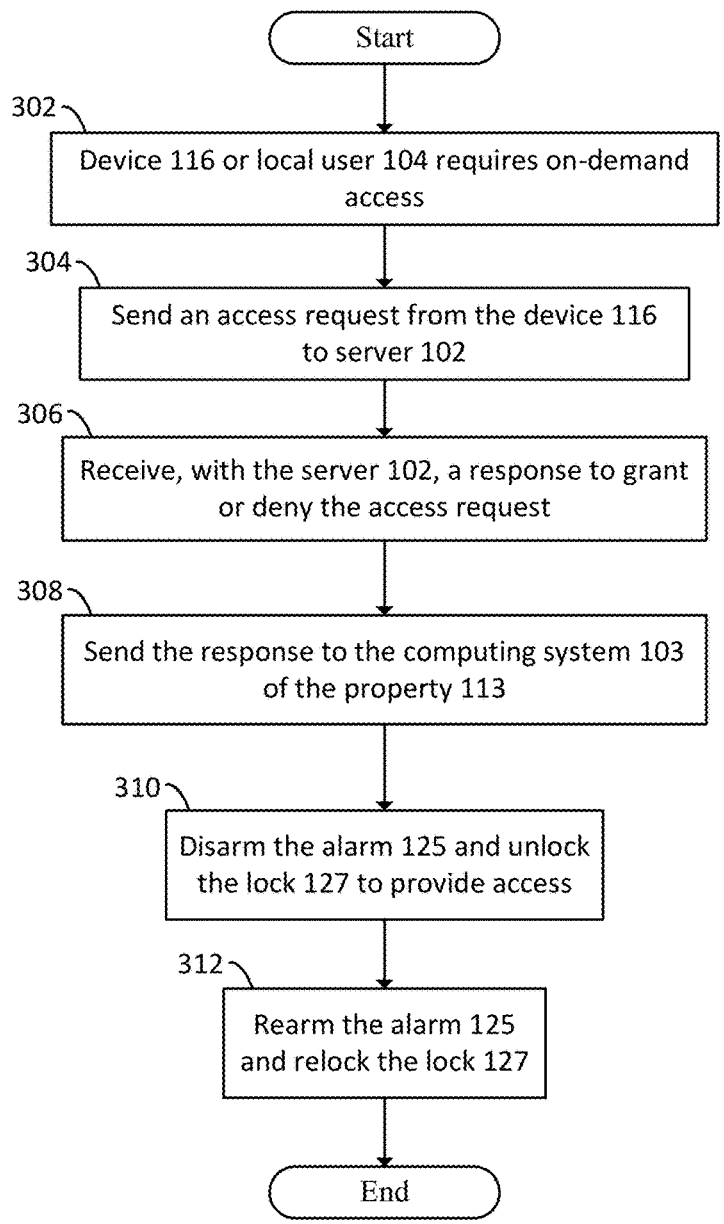
FIG. 3 illustrates an exemplary on-demand access process.

FIG. 3 illustrates an exemplary on-demand access process 300. Process 300 may take many different forms and include multiple and/or alternate components and facilities. While an exemplary process 300 is shown in FIG. 3, the exemplary components illustrated in FIG. 3 are not intended to be limiting. Indeed, additional or alternative components and/or implementations may be used.

At block 302, the device 116 or local user 104 may need on-demand access to the property 113. For example, the device 116 or local user 104 may arrive at the property 113 without scheduling access with or being expected by the remote user 104. The device 116 or local user 104 (e.g., a repair service provider) may have been rescheduled from a previously scheduled access (e.g., repair service) or may require access due to an unexpected circumstance.

At block 304, the device 116 or local user 104 sends an access request (e.g., via a notification) to the server 102. For example, the device 116 or user interface 109 of the property 113 may communicate with server 102 using connection 115, which may communicate the access request to device 117 or 118, e.g., using a web-based portal or a notification. Alternatively, the user interface of property 113 may display access information (e.g., a phone number of the remote or admin user 104), which the local user 104 may use to call the remote or admin user 104.

At block 306, the device 117 or 118 (e.g., admin or remote user 104) may receive the access request (e.g., using device 117 or 118). The device 117 or 118 (e.g., admin or remote user 104) may provide a response to grant or deny the access request to the server 102.

At block 308, the server 102 may send the response to the computing system 103 of the property 113. For a response granting the access request, the server 102 may send a request to the computing system 103 of the property 113 to disarm the alarm 125, unlock the lock 127, and display an access granted indication as part of user interface 109 of the property 113. For a response denying the access request, the server 102 may send a request to the computing system 103 of the property 113 to display an access denied indication as part of the user interface 109 of the property 113. Alternatively, the server 102 may send an access code to the device 116, as described above.

At block 310, the alarm 125 may be disarmed and lock 127 may be unlocked thereby providing access to the property 113.

At block 312, the alarm 125 may be rearmed and lock 127 may be relocked, as described above in process 200. After block 310, the process 300 ends.

Figure 4:
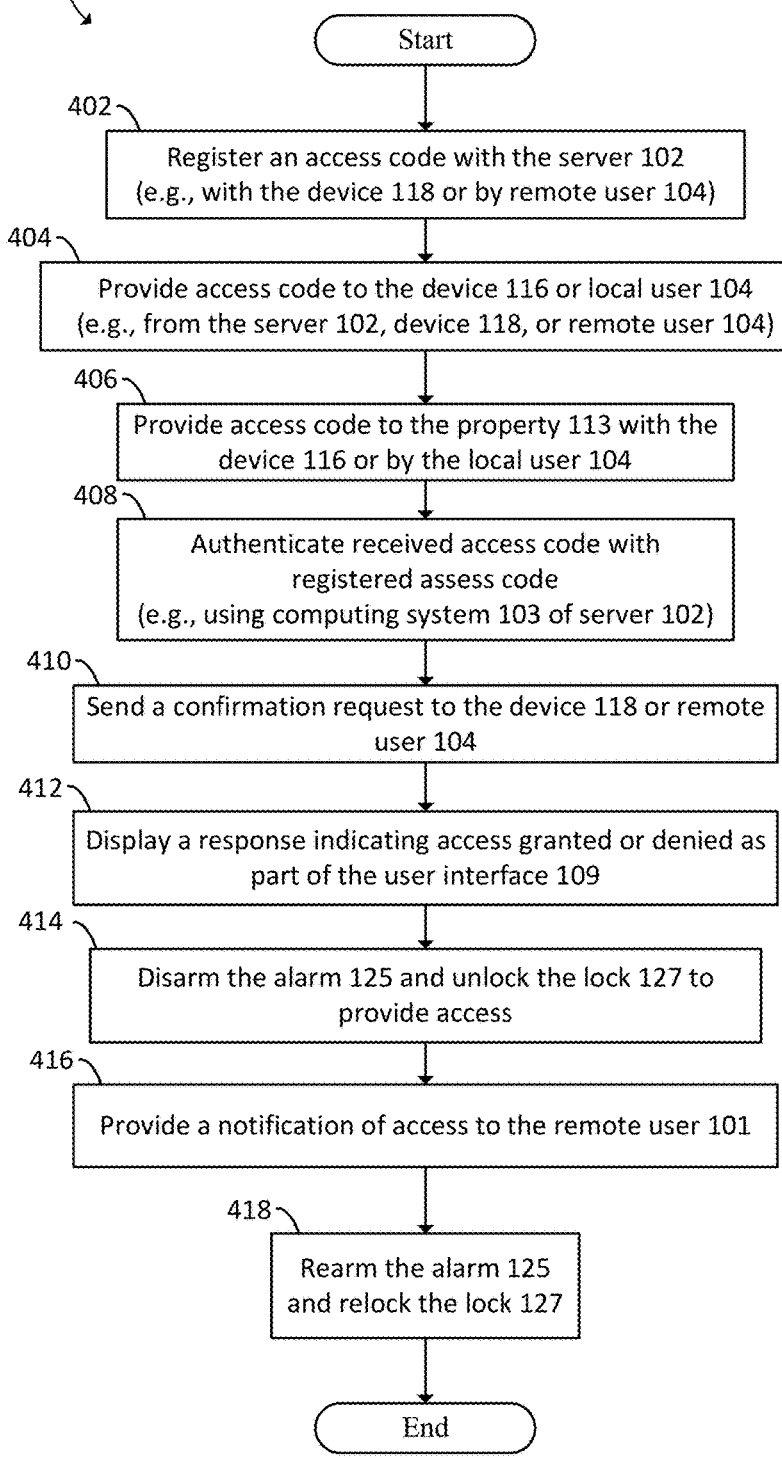
FIG. 4 illustrates an exemplary remote access confirmation process.

FIG. 4 illustrates an exemplary remote access confirmation process 400. Process 400 may take many different forms and include multiple and/or alternate components and facilities. While an exemplary process 400 is shown in FIG. 4, the exemplary components illustrated in FIG. 4 are not intended to be limiting. Indeed, additional or alternative components and/or implementations may be used.

At block 402, the device 118 or remote user 104 may register an access code and associated access preferences with the server 102 for the device 116 or local user 104 to access the property 113.

At block 404, the access code is provided to the device 116 or local user 104, as described for process 200 above.

At block 406, the access code may be provided to the property 113 by the device 116 or local user 104, as described for process 200 above.

At block 408, the computing system 103 of server 102 or property 113 may authenticate the received access code with the registered access code of the server 102, as described for process 200 above. If the access codes match, the server 104 may send a request to the device 118 or remote user 104 to confirm that the device 116 or local user 104 should be permitted access. If the access codes do not match, the server 104 may send a notification to devices 117-118.

At block 410, the server 104 may send a confirmation request to the device 118 or remote user 104 to confirm that the device 116 or local user 104 should be permitted access (e.g., using an audio or video call from the user interface 109) or a direct call from the remote user 104 (e.g., using device 118) to the device 116 or local user 104. If the remote user 104 confirms that access is permitted, the server 1021 may provide a response to computing system 103 of the property 113 to disarm the alarm 125, unlock the lock 127, and display an indication that access has been granted. If the device 118 or remote user 104 does not confirm that access is permitted, the server 104 may send a notification to devices 117-118 and a response to computing system 103 of the property 113 to display an indication that access has been denied.

At block 412, the user interface 109 of the property 113 may display a response to the local user 104 indicating granted access (e.g., in response to matching access codes) or denied access (e.g., in response to non-matching access codes) regarding access to the property 113, as described for process 200 above.

At block 414, the alarm 125 may be disarmed and lock 127 may be unlocked thereby providing access to the property 113.

At block 416, a notification indicating access may be provided to the device 118 or remote user 104, e.g., in response to an indication from sensor 123 that the device 116 or local user 104 has accessed the property 113.

At block 418, the alarm 125 may be configured to rearm the alarm 125 and relock the lock 127, as described for process 200 above.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A computing system, comprising:
   a user interface;
   a processor and a memory having a program communicatively connected to the processor, the processor being configured to:
      receive, with the user interface, a registered access code and access permissions from a remote user of a property having a property location, the registered access code being configured to provide access to the property, the access permissions at least specifying a video access confirmation and a predefined access period that the access code is valid to provide access to the property,
      capture in real-time, based on the video access confirmation as part of the access permissions, a video of a local user of the property, the capture being in response to subscriber information including a user location of the local user near the property location, wherein the captured video is confirmed by the remote user and a provided access code is automatically distributed to the local user in response to the captured video being confirmed by the remote user,
      receive the provided access code that was automatically distributed to the local user in response to the confirming of the captured video by the remote user,
      match the provided access code with the registered access code,
      grant access to the property based in part on if the provided access code matches the registered access code and is received within the predefined access period, and
      deny access to the property based in part on if the provided access code does not match the registered access code or is not received within the predefined access period.

2. The system of claim 1, the processor further being configured to:
   receive a provided biometric input from the local user at the property,
   match the provided biometric input with a registered biometric input included as part of the access permissions,
   grant access to the property based in part on if the provided biometric input matches the registered biometric input, and
   deny access to the property based in part on if the provided biometric input does not match the registered biometric input.

3. The system of claim 2, wherein the biometric input includes at least one of a fingerprint, voiceprint, and facial recognition.

4. The system of claim 1, the processor further being configured to: automatically send in real-time the video of the local user to the remote user in response to the video access confirmation being specified as part of the access permissions.

5. The system of claim 1, the processor further being configured to disarm an alarm of the property in response to the provided access code matching the registered access code and being received within the predefined access period, wherein the predefined access period includes at least one of a time period and a number of access attempts.

6. The system of claim 1, the processor further being configured to unlock a lock of the property in response to the provided access code matching the registered access code and being received within the predefined access period, wherein the predefined access period includes at least one of a time period and a number of access attempts.

7. The system of claim 1, further comprising a transceiver operatively connected to the processor, the transceiver being configured to determine the user location using a global positioning system.

8. A non-transitory computer-readable medium tangibly embodying computer-executable instructions of a program being executable by a processor of a computing device to provide operations comprising:
   receive a registered access code and access permissions from a remote user of a property having a property location, the registered access code being configured to provide access to the property, the access permissions at least specifying a video access confirmation and a predefined access period that the access code is valid to provide access to the property, capture in real-time, based on the video access confirmation as part of the access permissions, a video of a local user of the property, the capture being in response to subscriber information including a user location of the local user near the property location, wherein the captured video is confirmed by the remote user and a provided access code is automatically distributed to the local user in response to the captured video being confirmed by the remote user, receive the provided access code that was automatically distributed to the local user in response to the confirming the captured video by the remote user, match the provided access code with the registered access code, grant access to the property based in part on if the provided access code matches the registered access code and is received within the predefined access period, and deny access to the property based in part on if the provided access code does not match the registered access code or is not received within the predefined access period.

9. The medium of claim 8, the operations further comprising:

receive a provided biometric input from the local user at the property, match the provided biometric input with a registered biometric input included as part of the access permissions, grant access to the property based in part on if the provided biometric input matches the registered biometric input, and deny access to the property based in part on if the provided biometric input does not match the registered biometric input.

10. The medium of claim 8, wherein the biometric input includes at least one of a fingerprint, voiceprint, and facial recognition.

11. The medium of claim 8, the operations further comprising:

automatically send in real-time the video of the local user to the remote user in response to the video access confirmation being specified as part of the access permissions.

12. The medium of claim 8, the operations further comprising: disarm an alarm of the property in response to the provided access code matching the registered access code and being received within the predefined access period.

13. The medium of claim 8, the operations further comprising: unlock a lock of the property in response to the provided access code matching the registered access code and being received within the predefined access period.

14. The medium of claim 8, wherein the user location is determined with a transceiver using a global positioning system.

15. A method comprising:

receiving a registered access code and access permissions from a remote user of a property having a property location, the registered access code being configured to provide access to the property, the access permissions at least specifying a video access confirmation and a predefined access period that the access code is valid to provide access to the property, capture in real-time, based on the video access confirmation as part of the access permissions, a video of a local user of the property, the capture being in response to subscriber information including a user location of the local user near the property location, wherein the captured video is confirmed by the remote user and a provided access code is automatically distributed to the local user in response to the captured video being confirmed by the remote user, receive the provided access code that was automatically distributed to the local user in response to the confirming of the captured video by the remote user, matching the provided access code with the registered access code, granting access to the property based in part on if the provided access code matches the registered access code and is received within the predefined access period, and denying access to the property based in part on if the provided access code does not match the registered access code or is not received within the predefined access period.

16. The method of claim 15, further comprising:

receiving a provided biometric input from the local user at the property, matching the provided biometric input with a registered biometric input included as part of the access permissions, granting access to the property based in part on if the provided biometric input matches the registered biometric input, and denying access to the property based in part on if the provided biometric input does not match the registered biometric input.

17. The method of claim 15, wherein the biometric input includes at least one of a fingerprint, voiceprint, or facial recognition.

18. The method of claim 15, further comprising: automatically sending in real-time the video of the local user to the remote user in response to the video access confirmation being specified as part of the access permissions.

19. The method of claim 15, further comprising: disarming an alarm of the property in response to the provided access code matching the registered access code and being received within the predefined access period.

20. The method of claim 15, further comprising: unlocking a lock of the property in response to the provided access code matching the registered access code and being received within the predefined access period.

* * * * *